Jan. 14, 1941.     O. H. FOWLER     2,228,597
FLUID PRESSURE BRAKING SYSTEM
Filed July 16, 1938     3 Sheets-Sheet 1
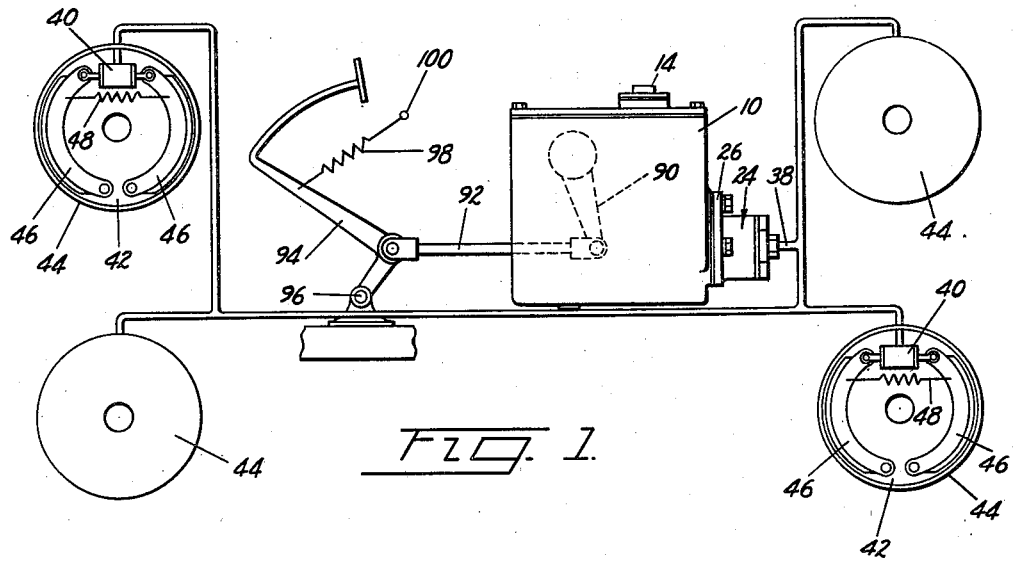
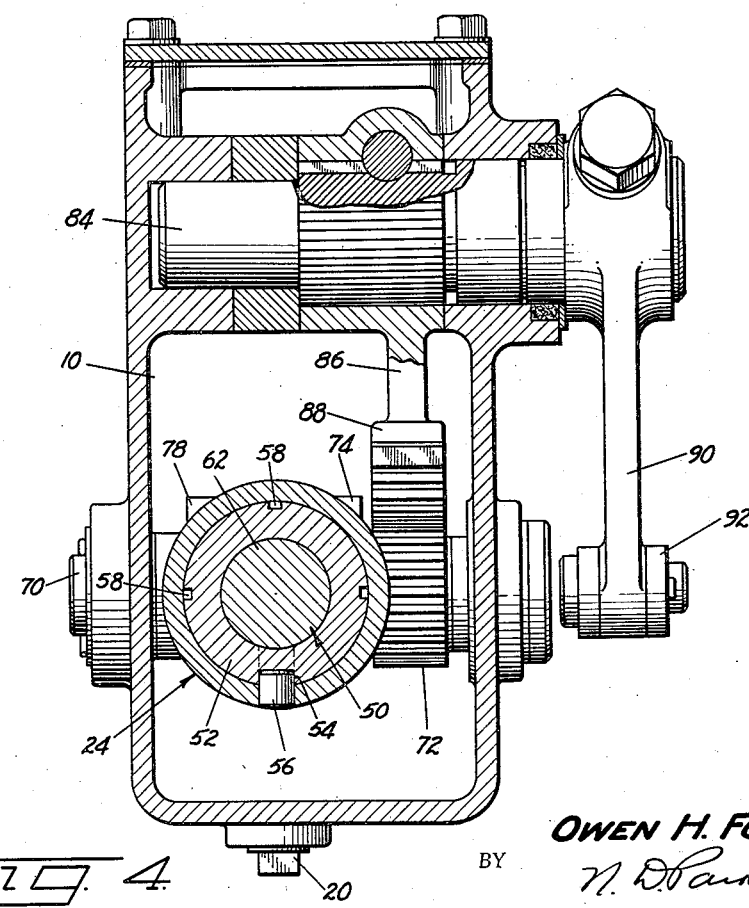
INVENTOR.
OWEN H. FOWLER
BY
ATTORNEY.

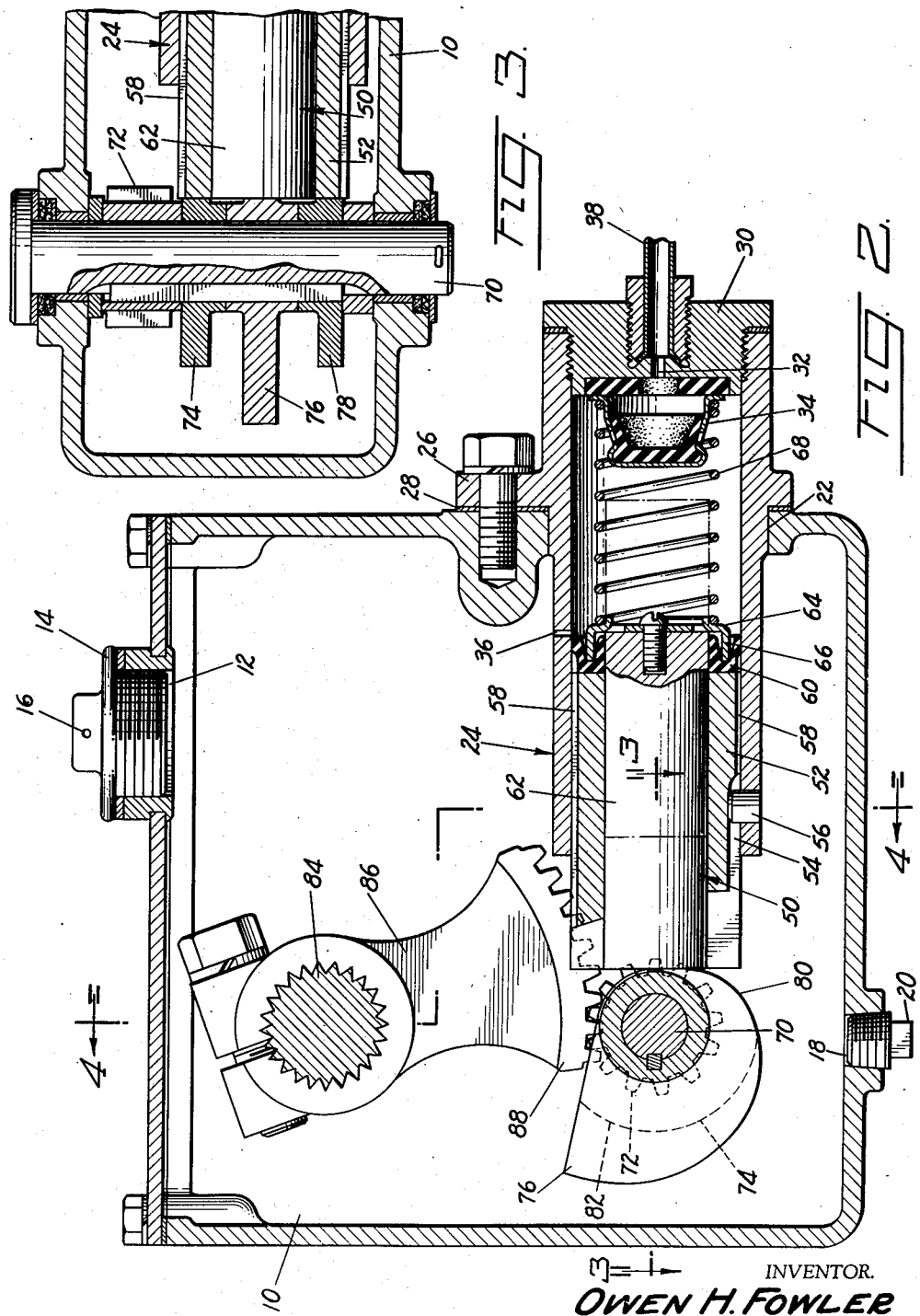

Jan. 14, 1941. O. H. FOWLER 2,228,597
FLUID PRESSURE BRAKING SYSTEM
Filed July 16, 1938 3 Sheets-Sheet 3

INVENTOR.
OWEN H. FOWLER
BY
ATTORNEY.

Patented Jan. 14, 1941

2,228,597

UNITED STATES PATENT OFFICE 2,228,597

FLUID PRESSURE BRAKING SYSTEM

Owen H. Fowler, Detroit, Mich., assignor to Hydraulic Brake Company, Detroit, Mich., a corporation of California Application July 16, 1938, Serial No. 219,633

5 Claims. (Cl. 60—54.6)

This invention relates to fluid pressure braking systems, and more particularly to fluid pressure producing devices for such systems.

Broadly the invention comprehends a fluid pressure producing device of the type in which pressure may be compounded without proportionately increasing the applied force.

An object of the invention is to provide a fluid pressure producing device of the compound type operative to effect a transition from low to high pressure without increase in the applied force.

Another object of the invention is to provide a fluid pressure producing device including a cylinder, and a piston movable in the cylinder having a plurality of relatively movable parts which may be actuated at different rates of travel.

Another object of the invention is to provide a fluid pressure producing device of the compound type operative to distribute the transition from low to high pressure over a prolonged period so as to smooth out the operation of the device.

Other objects and advantages of the invention will appear from the following description taken in connection with the drawings forming a part of this specification, and in which:

Fig. 1 is a schematic view of a fluid pressure braking system embodying the invention;

Fig. 2 is a vertical sectional view of the fluid pressure producing device;

Fig. 3 is a sectional view substantially on line 3—3, Fig. 2;

Fig. 4 is a sectional view substantially on line 4—4, Fig. 2;

Figure 5:
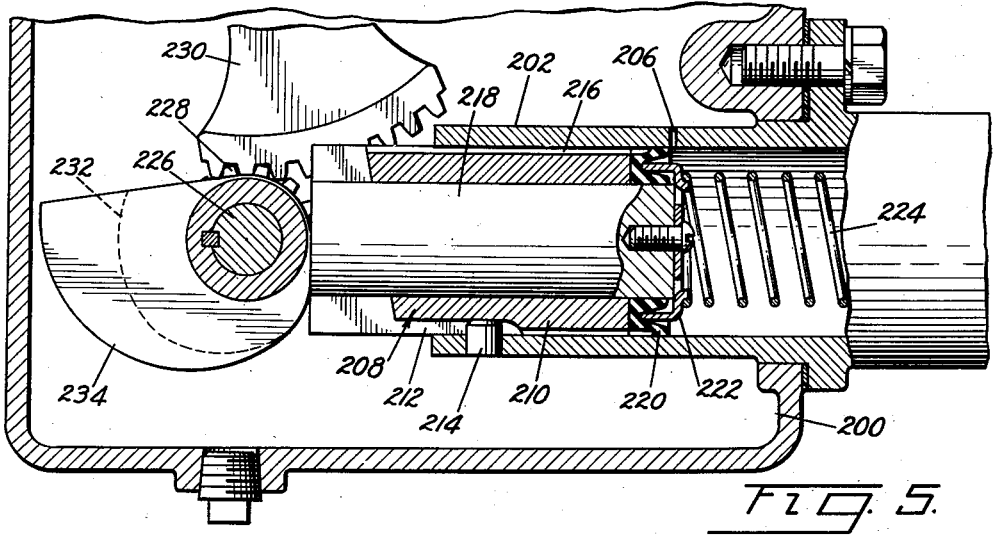
Fig. 5 is a fragmentary view illustrating a modification of the fluid pressure producing device in retracted position.

Referring to the drawings for more specific details of the invention, 10 represents a fluid reservoir having a filling opening 12, normally closed as by a plug 14, provided with openings 16 for venting the reservoir to the atmosphere. The reservoir also has a drain opening 18 in its bottom normally closed by a plug 20, and arranged in the wall of the reservoir adjacent the bottom thereof is an opening 22.

A cylinder 24 fitted in the opening 22 has a flange 26 bolted or otherwise secured to the wall of the reservoir with a suitable gasket 28 interposed so as to inhibit seepage of fluid. As shown, the cylinder is supported partly within and partly outside the reservoir and in parallel relation to the bottom of the reservoir. The inner end of the cylinder opens directly into the reservoir, and the outer end of the cylinder is closed as by a head 30 having a discharge port 32 controlled by a two-way valve 34, and arranged in the wall of the cylinder is a port 36 providing a communication between the cylinder and the reservoir.

A fluid pressure delivery pipe or conduit 38 connected to the discharge port 32 has branches connected respectively to fluid pressure actuated motors 40, preferably arranged in pairs, one pair for actuating the brakes associated with the front wheels of the vehicle and another pair for actuating the brakes associated with the rear wheels of the vehicle.

The brakes are preferably of a conventional type, each including a fixed support or backing plate 42 adapted to be secured to an axle or to an axle housing, a rotatable drum 44 associated with the backing plate and adapted to be secured to a wheel, a pair of corresponding interchangeable friction elements or shoes 46 pivoted on the backing plate, a retractile spring 48 connecting the shoes, and a fluid pressure actuated motor corresponding to the motors 40 mounted on the backing plate between the shoes and operative to actuate the shoes into engagement with the drum 44 against the resistance of the retractile spring 48.

A piston indicated generally at 50 is mounted for reciprocation in the cylinder 24. This piston includes a shell 52 having a longitudinal slot 54 receiving a pin 56 mounted in the wall of the cylinder for inhibiting relative rotation between the piston and the cylinder. The shell also has a plurality of spaced circumferential longitudinal grooves or passages 58 providing communications between the reservoir and that portion of the cylinder forward of the piston, and supported on the rim of the shell is an annular double-lip sealing cup 60 controlling the passages 58.

An auxiliary piston or plunger 62 reciprocable in the shell 52 is embraced by the inner lip of the annular sealing cup 60 so as to inhibit seepage of fluid from the cylinder between the shell and the plunger, and suitably secured on the head of the plunger is a spring seat 64 having a marginal flange 66 normally seated on the sealing cup between the inner and outer lips thereof, and a spring 68 interposed between the spring seat 64 and the two-way valve 34 serves to retain the valve in position and also to return the piston to its retracted position.

A shaft 70, arranged transversely of the reservoir and suitably journaled in the wall thereof, has keyed thereon a pinion 72 and a group of cams 74, 76 and 78. The cams 74 and 78 correspond to one another and are spaced apart by the hub of the cam 76. The lobes of the cams 74 and 78 engage the rear rim of the shell 52 of the piston, and the lobe of the cam 76 engages the rear end of the plunger 62. The lobes of the cams have the same pitch, as indicated at 80, for substantially one-fourth of their pitch lines so that the piston 50 may be actuated as a single unit for a predetermined movement, at the conclusion of which, the pitch line of each of the cams 74 and 78 terminates into a radius 82, the center of which is in the axis of the cam, so as to retain the shell 52 against movement; and the pitch line of the cam 76 has a constant lift or rise so that the plunger may be advanced.

A shaft 84 mounted transversely of the reservoir has keyed thereon within the reservoir an arm 86 carrying a gear sector 88 in mesh with the pinion 72, and suitably secured to the shaft 84 outside of the reservoir is an arm 90 connected as by a rod 92 to a foot pedal lever 94 pivotally mounted on a stub shaft 96 and connected by a retractile spring 98 to a fixed support 100.

Figure 6:
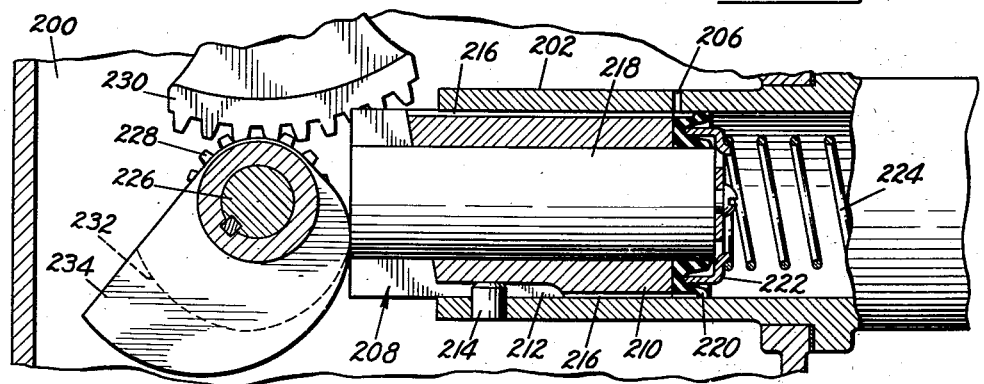
Fig. 6 is a similar view illustrating the fluid pressure producing device during initial actuation.
Figure 7:
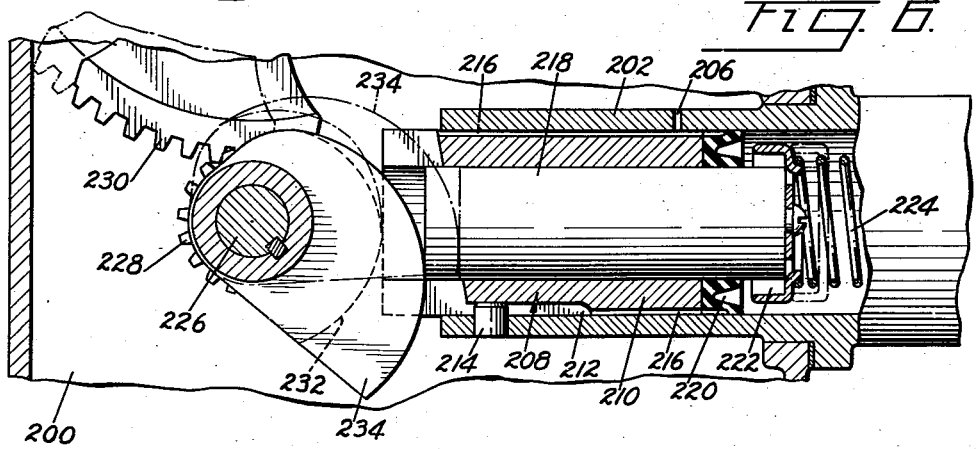
Fig. 7 is likewise a similar view illustrating the fluid pressure producing device at the end of its compression stroke.

A modification of the invention is illustrated in Figs. 5 to 7, both inclusive. In this modification a reservoir 200 has mounted in its wall a cylinder 202 supported partly within and partly outside of the reservoir. The inner end of the cylinder opens directly into the reservoir, and the outer end of the cylinder is closed as by a conventional head having a discharge port connected to the braking system, and arranged in the wall of the cylinder is a port 206 providing a communication between the cylinder and the reservoir.

A piston 208 reciprocable in the cylinder includes a shell 210 slotted as at 212 for the reception of a pin 214 mounted in the wall of the cylinder. The shell also has a plurality of spaced grooves or channels 216 providing communications between the reservoir 200 and that portion of the cylinder 202 forward of the piston. An auxiliary piston or plunger 218 reciprocable in the shell is embraced by a sealing cup 220 seated on the shell and held against displacement by a spring rest 222 attached to the plunger, and a spring 224 seated on the spring rest serves to return the piston to its retracted position.

A shaft 226 mounted in the wall of the cylinder has thereon a pinion 228 in mesh with a gear sector 230 corresponding to the gear sector 88 in the preferred embodiment of the invention. The shaft 226 also has keyed thereon corresponding spaced cams 232 and an intermediate cam 234. The cams 232 actuate the shell 210, and the cam 234 actuates the plunger 218. The lobes of these cams have the same pitch for a substantial portion of their pitch lines, so that the piston may be actuated as a single unit for a predetermined movement, and the remaining portions of the pitch lines of the cams are so correlated that the shell is moved at one rate of travel and the plunger is moved at another rate of travel. This differential in the rates of travel of the shell and plunger effects a transition from low to high pressure in increments, thus smoothing out the operation to such an extent that a transfer from low to high pressure is effected without proportionately increasing the applied force.

In a normal operation of the device, as illustrated in Figs. 1 to 4, upon depressing the foot pedal lever 94, force is transmitted therefrom through the rod 92 to the arm 90 keyed on the shaft 84. This results in movement of the shaft through an angle, and this movement of the shaft is transmitted through the arm 86 on the shaft and the gear sector 88 on the arm to the pinion 72, resulting in driving the pinion.

This actuation of the pinion 72 moves the shaft 70 through an angle, and corresponding movement is imparted by the shaft to the cams 74, 76 and 78 engaging the piston 50. This results in advancing the piston on its compression stroke. During the initial movement of the piston on its compression stroke, the sealing cup 60 closes the port 36, and thereafter, as the piston advances, the fluid in the cylinder 24 forward of the piston is displaced therefrom past the two-way valve 34, through the discharge port 32 and the fluid pressure delivery pipe 38 and its respective branches into the fluid pressure actuated motors 40, causing energization of the motors and resulting in actuation of the shoes 46 into engagement with the drums 44 against the resistance of the retractile springs 48.

The lobes of the cams 74 and 78 engage the shell 52 of the piston, and the lobe of the cam 76 engages the plunger 62. The lobes of these cams have the same pitch for substantially one-fourth of their pitch lines. Accordingly, the shell and plunger move concomitantly as a single unit for a predetermined portion of the stroke of the piston.

At the conclusion of this predetermined movement, the cams 74 and 76 terminate in a radius 82, the center of which is in the axis of the cams. This serves to retain the shell in a fixed position during the remainder of the stroke of the piston. The cam 76 has a pitch providing a constant lift or rise, hence the plunger 62 is advanced during the remainder of the stroke of the piston so as to effect a transition from a low pressure to a relatively high pressure without proportionately increasing the applied force.

Upon the conclusion of a braking operation, the applied force is released and the actuating mechanism is returned to its retracted position, as in general practice. This results in release of the piston 50 and return thereof to its retracted position under the influence of the retractile spring 68.

As the piston returns to its retracted position, a partial vacuum is created in that portion of the cylinder 24 forward of the piston, and this results in drawing fluid from the reservoir 10, through the passages 58, past the sealing cup 60, into that portion of the cylinder forward of the piston, completely filling the cylinder.

During this operation fluid is returning to the cylinder 24 from the fluid pressure actuated motors and the fluid pressure delivery pipes connecting the motors to the cylinder, under the influence of the retractile springs 98. This results in the cylinder receiving a quantity of fluid in excess of its capacity, and, under this condition, the excess fluid is displaced from the cylinder through the port 26 into the reservoir.

The operation of the device as illustrated in Figs. 5 to 7 is the same as that of the device illustrated in Figs. 1 to 4, except that the cams in the modification are so correlated that the shell and plunger are first actuated in unison, and, thereafter, at different rates of travel.

Although this invention has been described in connection with certain specific embodiments, the principles involved are susceptible of numerous other applications that will readily occur to persons skilled in the art. The invention is, therefore, to be limited only by the scope of the appended claims.

Having thus described the various features of the invention, what I claim as new and desire to secure by Letters Patent is:

1. A fluid pressure producing device comprising a cylinder, a piston movable therein having telescopic parts, cams for actuating the parts having the same pitch for a portion of their pitch lines, and a different pitch for the remaining portion of their pitch lines.

2. A fluid pressure producing device comprising a cylinder, a piston movable therein including telescopic parts, and cams for actuating the parts having the same pitch for a portion of their pitch lines, one of the cams having a constant rise and the remainder of the cams terminating into a radius having a center in the axis of the cams.

3. A fluid pressure producing device comprising a reservoir, a cylinder supplied therefrom, a piston movable in the cylinder including telescopic parts, and an actuator for the piston including cams having lobes of different pitch lines adapted to move the parts in unison for a portion of the travel of the piston, and thereafter to retain one of the parts against retrograde movement and to advance the other part.

4. A fluid pressure producing device including a reservoir, a cylinder supplied therefrom, a piston movable in the cylinder including telescopic parts, sealing means carried by the piston, means for returning the piston to its retracted position, means for advancing the piston including cams having lobes of different pitch lines adapted to move the parts in unison during initial advance of the piston, and thereafter to retain one of the parts against retrograde movement and to advance the other part.

5. A fluid pressure producing device including a reservoir and a cylinder supplied therefrom, a piston movable in the cylinder including telescopic parts, a sealing cup carried on the piston for sealing the piston and parts, an actuator for the piston including a gang of cams operative to move the parts in unison during the initial movement of the piston, and thereafter to move the parts at different rates of travel.

OWEN H. FOWLER.